(12) United States Patent
Mou et al.

(10) Patent No.: US 10,415,561 B2
(45) Date of Patent: Sep. 17, 2019

(54) EYEGLASS BUFFER PROTECTION DEVICE

(71) Applicant: Microjet Technology Co., Ltd., Hsinchu (TW)

(72) Inventors: Hao-Jan Mou, Hsinchu (TW); Ta-Wei Hsueh, Hsinchu (TW); Wei-Ming Lee, Hsinchu (TW); Chi-Feng Huang, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 15/943,071

(22) Filed: Apr. 2, 2018

(65) Prior Publication Data

US 2018/0291887 A1    Oct. 11, 2018

(30) Foreign Application Priority Data

Apr. 11, 2017  (TW) .............................. 106112090 A

(51) Int. Cl.
| | |
|---|---|
| G02C 1/00 | (2006.01) |
| F04B 45/047 | (2006.01) |
| F04B 51/00 | (2006.01) |
| F04B 49/22 | (2006.01) |
| G02C 11/00 | (2006.01) |
| G02C 5/14 | (2006.01) |
| G02C 5/16 | (2006.01) |
| F04B 49/02 | (2006.01) |
| F04B 35/04 | (2006.01) |
| F04B 49/06 | (2006.01) |
| F04B 49/08 | (2006.01) |

(52) U.S. Cl.
CPC ............ *F04B 45/047* (2013.01); *F04B 35/04* (2013.01); *F04B 49/02* (2013.01); *F04B 49/022* (2013.01); *F04B 49/06* (2013.01); *F04B 49/08* (2013.01); *F04B 49/22* (2013.01); *F04B 51/00* (2013.01); *G02C 5/143* (2013.01); *G02C 5/16* (2013.01); *G02C 11/10* (2013.01); *F04B 2205/05* (2013.01)

(58) Field of Classification Search
CPC .................................................. G02C 2200/16
USPC ........................................................... 351/43
See application file for complete search history.

(56) References Cited

U.S. PATENT DOCUMENTS

| 5,191,363 A * | 3/1993 | Smith .................... A61F 9/026 351/156 |
| 2014/0160421 A1 * | 6/2014 | Kavana .................. G02C 11/00 351/43 |

FOREIGN PATENT DOCUMENTS

| CN | 203953917 U | 11/2014 |
| CN | 205918569 U | 2/2017 |
| CN | 205982827 U | 2/2017 |

* cited by examiner

Primary Examiner — Hung X Dang
(74) Attorney, Agent, or Firm — Birch, Stewart, Kolasch & Birch, LLP

(57) ABSTRACT

An eyeglass buffer protection device for using in a pair of glasses comprises a min body, which has a penetrating channel and comprises an inflatable cushion, an air pump, a switch element and a control unit. When the switch element is turned on, the switch element issues an enabling signal to the control unit and the control unit enables the air pump in response to the enabling signal. When the air pump is enabled, an ambient gas is transferred to the inflatable cushion, so that the inflatable cushion is inflated with the gas and the main body is expanded. By penetrating the at least one leg of the glasses into the penetrating channel of the main body, the at least one leg is protected, and the main body fits closely with the ear of the user.

15 Claims, 10 Drawing Sheets

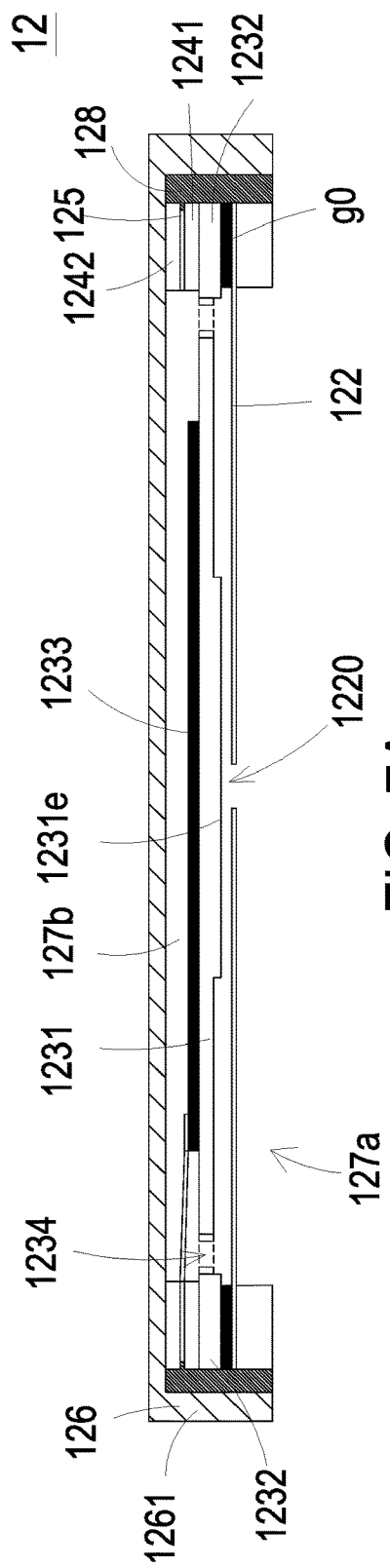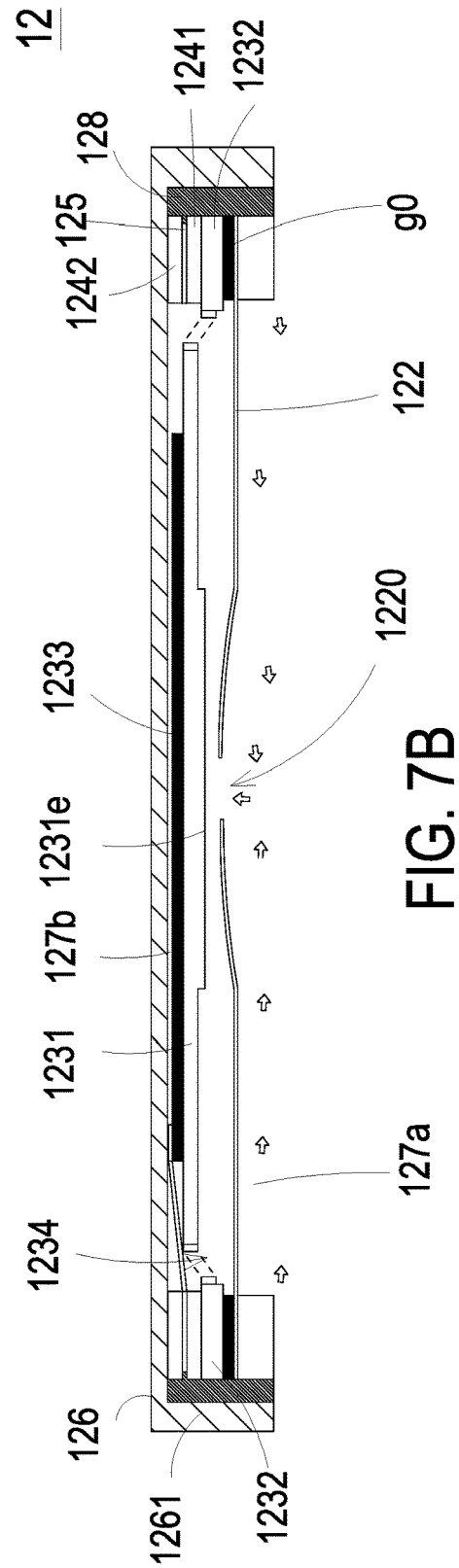
FIG. 7A
FIG. 7B

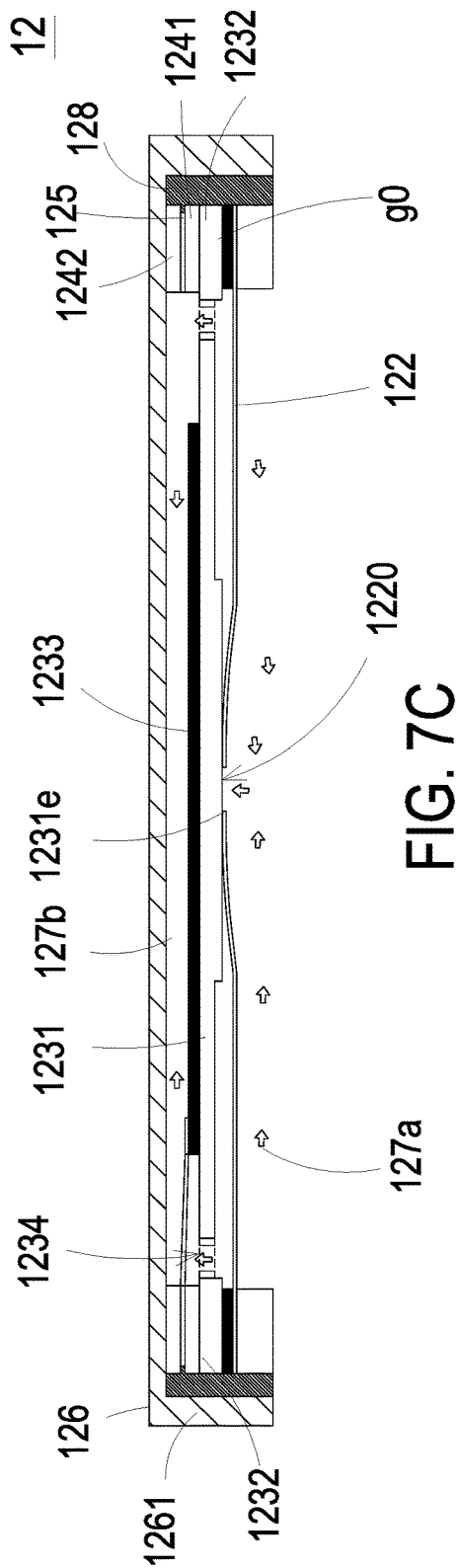
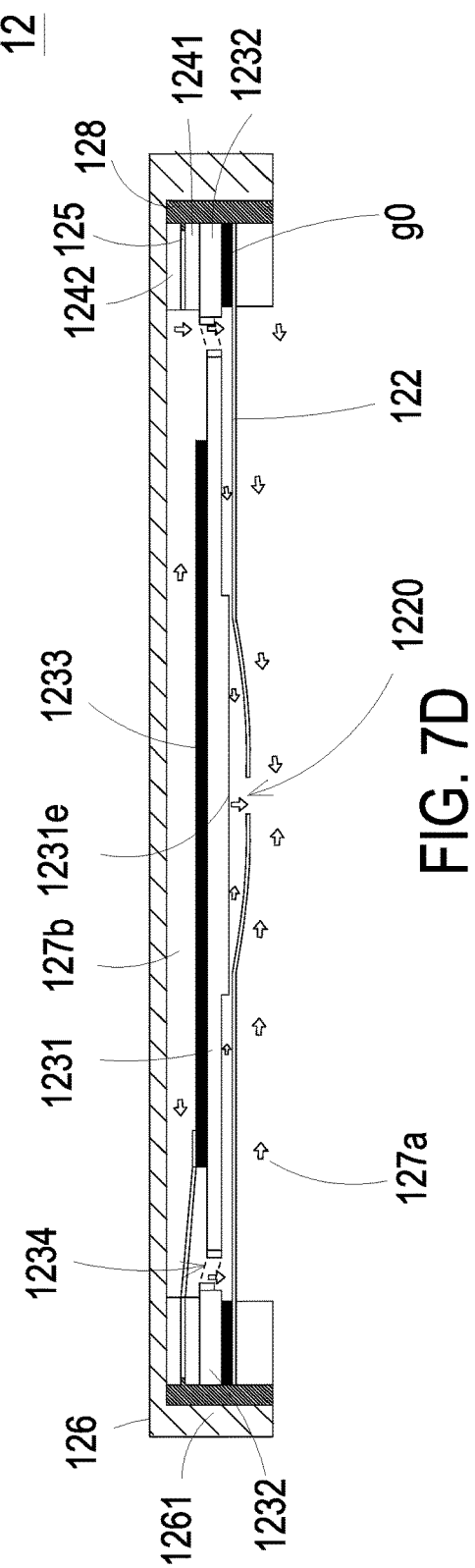
FIG. 7C
FIG. 7D

EYEGLASS BUFFER PROTECTION DEVICE

FIELD OF THE INVENTION

The present invention relates to an eyeglass buffer protection device, and more particularly to an eyeglass buffer protection device inflated by an air pump.

BACKGROUND OF THE INVENTION

With increasing development of science and technology, various 3C products are introduced into the market. Since the demands of modern people on the 3C products become higher and higher, the burdens on people's eyesight are heavier. As a result, the average age that people start needing to wear glasses is lowering, and the population wearing glasses is increasing. Thus, the manufacturers pay attention to the improvement of the aesthetically-pleasing appearance and the wearing comfort of the glasses.

Generally, the temples of the commercially available glasses are one-piece plastic structures, or the temples thereof are two metal brackets respectively wrapped by a plastic material earmuff. That is, the temples touch the ears by a surface of the plastic material. Since the plastic material is a hard material, the ears are uncomfortable when the glasses are worn. Moreover, the temples of the commercially available glasses cannot completely match the shapes of the user's ears. Under this circumstance, the glasses may fall down from the ears readily, thus damaging the glasses or causing danger if the user is taking exercise or driving.

Currently, some kinds of silicone hooks are commercially available. The silicone hooks are for being sheathed around the rear parts of the temples. When the glasses are worn by the user, the user's ears are hooked by the silicone hooks and thus the possibility of falling down the glasses is reduced. However, the process of sheathing the silicone hooks around the temples is troublesome. Moreover, because of the silicone hooks, it is more difficult to put on and take off the glasses. In addition, the silicone hooks also cannot completely match the shapes of the user's ears which results in foreign body sensation. Consequently, the overall comfort of wearing the glasses is impaired.

Therefore, there is a need of providing an eyeglass buffer protection device in order to increase the wearing comfort and safety.

SUMMARY OF THE INVENTION

An object of the present invention provides an eyeglass buffer protection device for using in a pair of glasses, which is comfortable and safe, resolving the problems with conventional glasses in which the ears feel uncomfortable and the glasses easily fall off while wearing.

In accordance with an aspect of the present invention, there is provided an eyeglass buffer protection device for using in a pair of glasses. The eyeglass buffer protection device comprises a min body. The main body has a penetrating channel and comprises an inflatable cushion, an air pump, a switch element and a control unit. The inflatable cushion has an expandable structure. The air pump is in communication with the inflatable cushion. The control unit is electrically connected with the switch element and the air pump. When the switch element is turned on by the user, the switch element issues an enabling signal to the control unit and the control unit enables the air pump in response to the enabling signal. When the air pump is enabled, an ambient gas is transferred to the inflatable cushion, so that the inflatable cushion is inflated with the gas and the main body is expanded. By penetrating the at least one leg of the glasses into the penetrating channel of the main body, the at least one leg is protected, and the main body fits closely with the ears of the user.

The above contents of the present invention will become more readily apparent to those ordinarily skilled in the art after reviewing the following detailed description and accompanying drawings, in which:

BRIEF DESCRIPTION OF THE DRAWINGS

FIGS. 7A to 7D schematically illustrate the actions of the air pump of FIGS. 4A and 4B;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
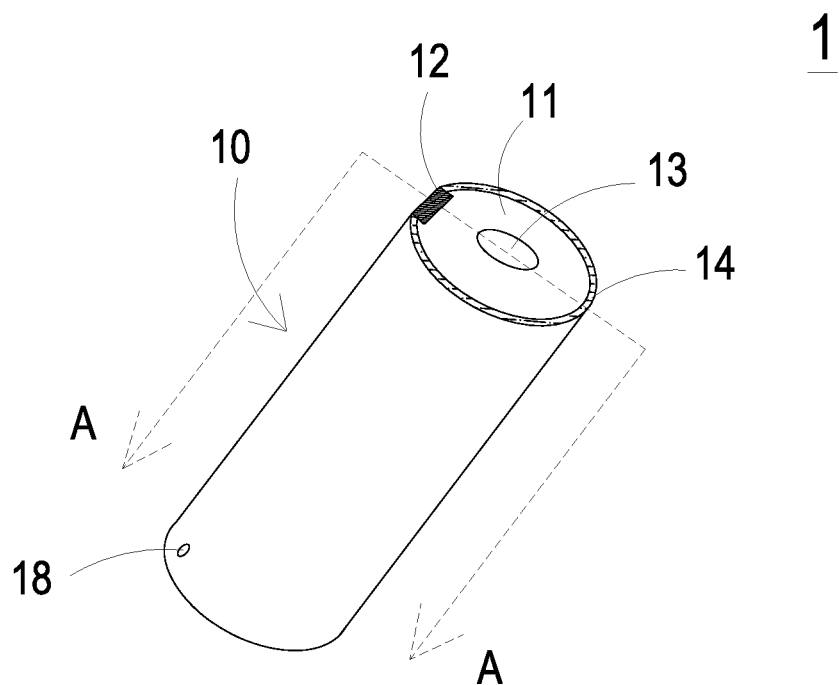
FIG. 1A is a schematic perspective view illustrating the outer appearance of a eyeglass buffer protection device according to a first embodiment of the present invention.

FIG. 1A is a schematic perspective view illustrating the outer appearance of an eyeglass buffer protection device according to a first embodiment of the present invention. As shown in FIG. 1A, the eyeglass buffer protection device 1 is composed of a main body 10, wherein a penetrating channel 13 is disposed in a central portion of the main body 10. The main body 10 further comprises an inflatable cushion 11, an air pump 12, a lining 14 and a pressure valve structure 18. Preferably but not exclusively, the inflatable cushion 11 is an arc column structure which is soft, one-piece, and expandable. In this embodiment, the air pump 12 is disposed within the main body 10. The air pump 12 is in communication with the inflatable cushion 11 for introducing gas into the inflatable cushion 11 from the exterior of the eyeglass buffer protection device 1. In this embodiment, a first surface 141 of the lining 14 is attached on a surface of the inflatable cushion 11. The lining 14 may be made of a soft and elastic material, and is subjected to deformation in response to the expansion of the inflatable cushion 11. The pressure valve structure 18 of the embodiment is embedded in a second surface 142 of the lining 14 which is opposing to the first surface 141 of the lining 14, and the pressure valve structure 18 is in communication with the inflatable cushion 11. The pressure valve structure 18 is a switchable valve structure comprising a check valve (not shown) and a relief valve (not shown). The check valve allows the gas to flow in one direction only to the inflatable cushion 11 without backflow. The relief valve is used for releasing the gas in the inflatable cushion 11 to the exterior surroundings of the eyeglass buffer protection device 1, so that the inner pressure of the inflatable cushion 11 is adjusted.

Figure 1B:
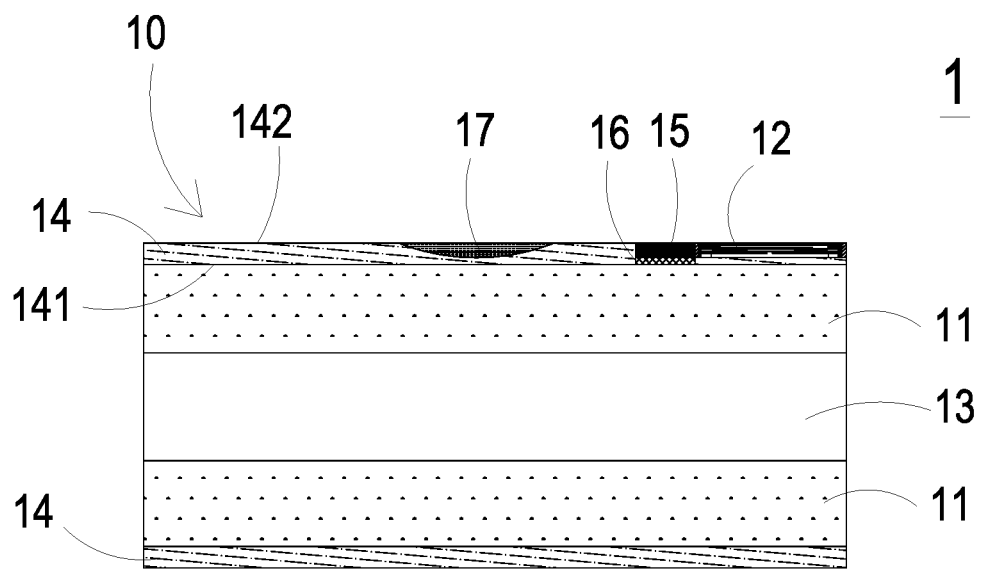
FIG. 1B is a schematic cross-sectional view illustrating the eyeglass buffer protection device of FIG. 1A and taken along line A-A.

Please refer to FIG. 1B. FIG. 1B is a schematic cross-sectional view illustrating the eyeglass buffer protection device of FIG. 1A and taken along line A-A. In the first embodiment of the present invention, the main body 10 of the eyeglass buffer protection device 1 further comprises a battery 15, a gas pressure sensor 16 and a switch element 17. The battery 15 is embedded within the lining 14 for providing electric power, and may be a mercury battery. The gas pressure sensor 16 is disposed within the lining 14 and is in air communication with the inflatable cushion 11 for detecting the inner pressure of the inflatable cushion 11. The switch element 17 is embedded in the second surface of the lining, while the position of the switch element 17 is not limited thereto and can be adjustable according the practical requirement. In this embodiment, the switch element 17 is a pressable switch structure, but not limited thereto.

Figure 2:
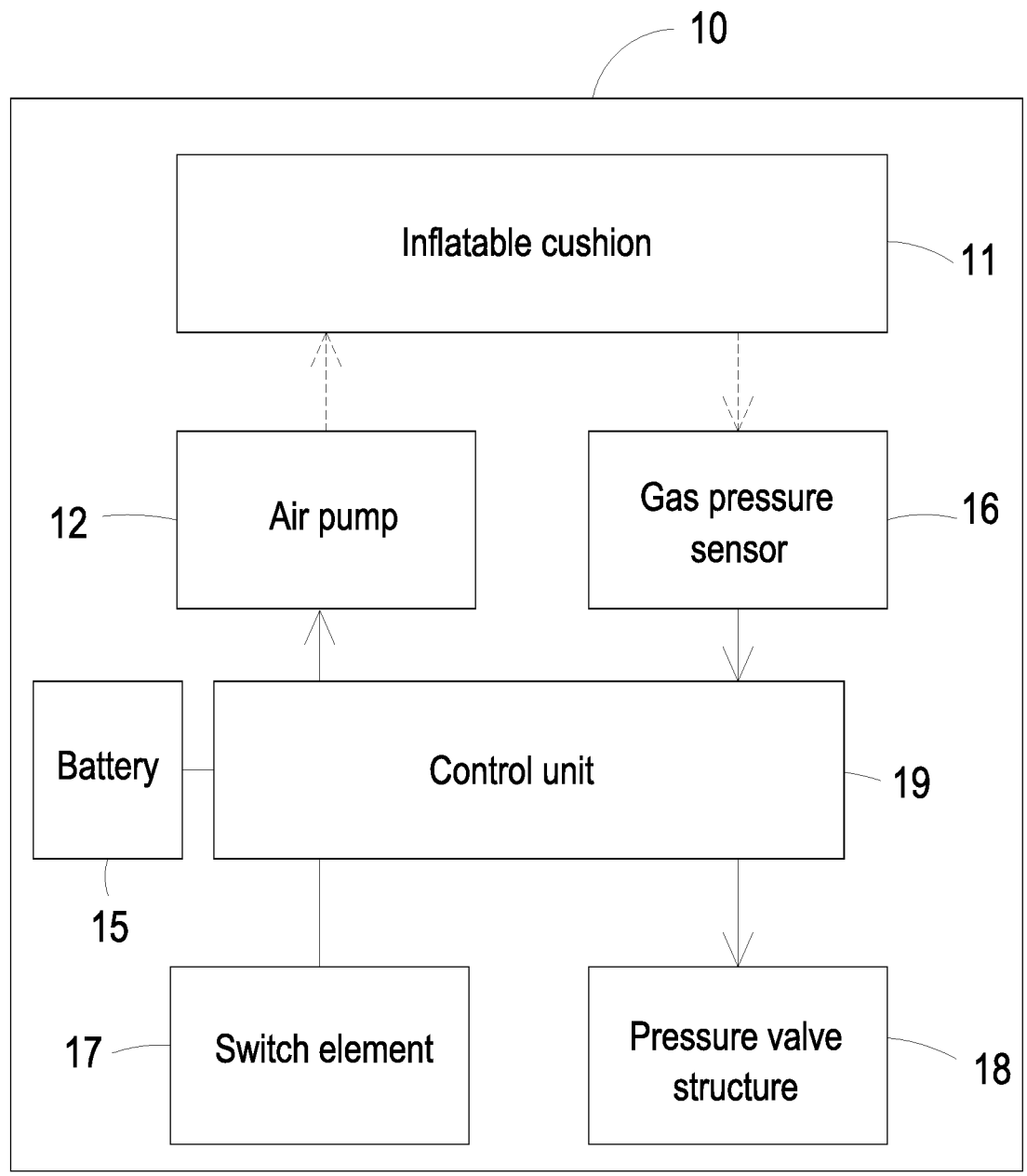
FIG. 2 is a schematic functional block diagram illustrating the architecture of the eyeglass buffer protection device according to an embodiment of the present invention.

Please refer to FIG. 2. FIG. 2 is a schematic functional block diagram illustrating the architecture of the eyeglass buffer protection device according to an embodiment of the present invention. In an embodiment of the present invention, the main body 10 of the eyeglass buffer protection device 1 further comprises a control unit 19. The control unit 19 is disposed within the lining 14 (not shown), but not limited thereto. The control unit 19 is used for sending signals, receiving signals and controlling elements to be drove or stopped. The control unit 19 is electrically connected with the battery 15 for receiving the electric power therefrom. The control unit 19 is also electrically connected with the air pump 12, the gas pressure sensor 16, the switch element 17 and the pressure valve structure 18. When the switch element 17 is turned on, the switch element 17 issues an enabling signal to the control unit 19. In response to the enabling signal, the control unit 19 enables the air pump 12 to transfer the gas into the inflatable cushion 11, so that the inflatable cushion 11 is inflated with the gas and expanded. The air pump 12 keeps working continuously after it is enabled. Once the gas pressure sensor 16 detects that the pressure of the gas within the inflatable cushions 11 is higher than a threshold value, the gas pressure sensor 16 issues a disabling signal to the control unit 19. In response to the disabling signal, the control unit 19 disables the air pump 12. Such configuration prevents the inflatable cushion 11 from being damaged by excessive pressure of the gas therein, and avoids the reduction of the use life of the air pump 12 due to continuous operation.

Moreover, when the switch element 17 is turned off, the switch element 17 issues a pressure-relief signal to the control unit 19. In response to the pressure-relief signal, the control unit 19 controls the pressure valve structure 18 to decrease the pressure in the inflatable cushion 11 by releasing the gas from the inflatable cushion 11 to the exterior surroundings of the eyeglass buffer protection device 1. After the inflatable cushion 11 is exhausted and restored to the deflated state, it can be easily detached and stored.

Figure 3:
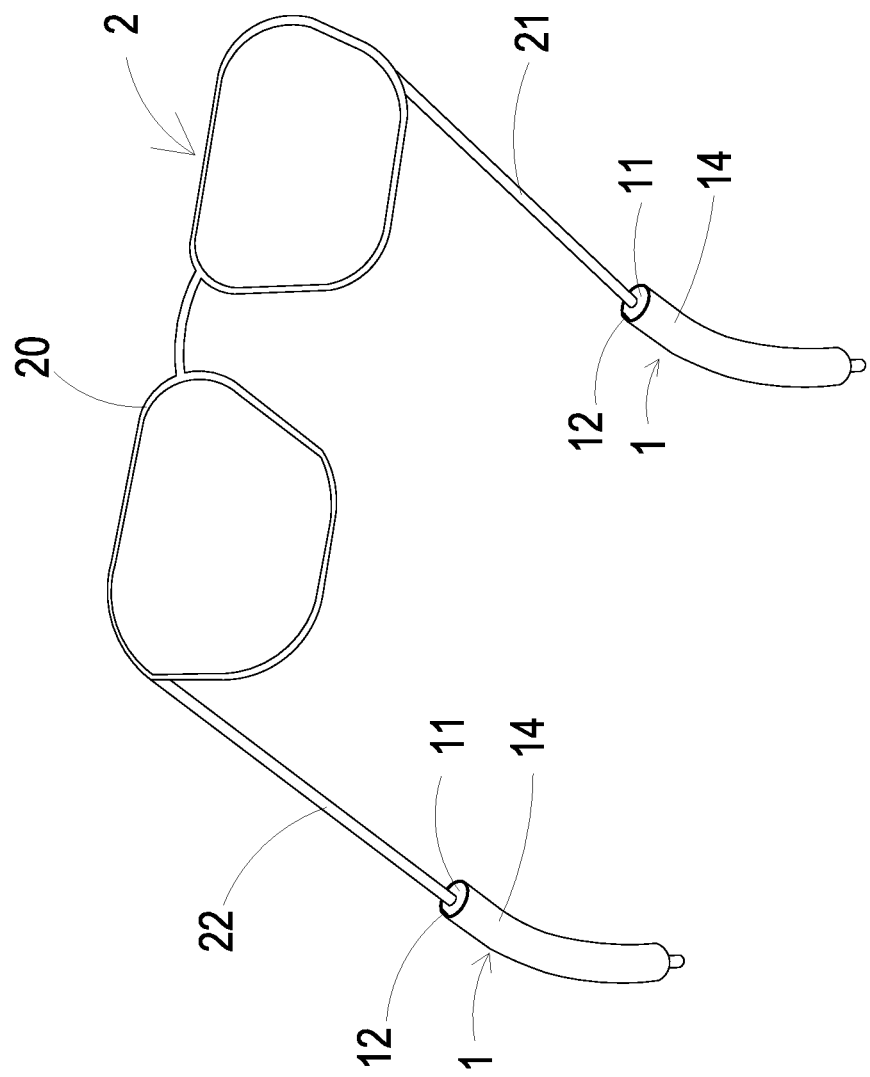
FIG. 3 is a schematic perspective view illustrating the eyeglass buffer protection device of the first embodiment assembling on the glasses.

Please refer to FIG. 2 and FIG. 3. FIG. 3 is a schematic perspective view illustrating the eyeglass buffer protection device of the first embodiment assembling on the glasses. The eyeglass buffer protection device 1 of the first embodiment can be applied to the glasses 2, wherein the glasses 2 comprises two legs 21, 22. In this embodiment, there are two eyeglass buffer protection devices 1 detachably wrap the two legs 21, 22, respectively, which means the two legs 21, 22 are respectively penetrating the penetrating channels 13 of the main bodies 10 of the two eyeglass buffer protection devices 1. When the user wears the glasses 2, the two eyeglass buffer protection devices 1 are in contact with the ears and the face of the user. By pressing the switch element 17 (see FIG. 2) of the eyeglass buffer protection device 1, the inflatable cushion 11 of the main body 10 is inflated with the gas and expanded as a buffer between the legs 21, 22 of the glasses 2 and the user's face or ears, so that the eyeglass buffer protection device 1 can closely fit the shape of the user's face or ears, and the glasses 2 is securely worn on the ears of the user and does not easily fall off, which is more safe and comfortable than conventional ones.

When the user wants to put off the glasses, by pressing the switch element 17 again, the gas of the inflatable cushion 11 will be exhausted to the surroundings through the pressure valve structure 18, by which the inflatable cushions 11 is restored to the deflated state so that the eyeglass buffer protection device 1 is convenient to detach and store.

In some embodiments, a soft cushion (not shown) is further applied on the second surface 142 of the lining 14, the arrangement of which can be adjusted according to practical requirements and according to positions correspondingly touched by the user's face or ears. The soft cushion is made of a soft, anti-slip material, which includes but is not limited to a silicone material. The disposition of the soft cushion can enhance comfort of wearing the glasses 2.

In some embodiments, the eyeglass buffer protection device 1 is not limited to be disposed on the distal ends of the legs 21, 22. The positions and the numbers of the eyeglass buffer protection device 1 can be adjustable according to the practical requirement to fit the user's face. For example, more than two eyeglass buffer protection devices 1 are disposed on the portions of the legs 21, 22 where are correspondingly touched by the user's face or ears. Likewise, the eyeglass buffer protection devices 1 can be fully inflated by the air pump 12 to expand to a certain extent to fit and attach on the user's face and ears. Therefore, the glasses 2 are fixed more stably on the user's face, and the comfort of wearing the glasses 2 is enhanced.

Figure 4A:
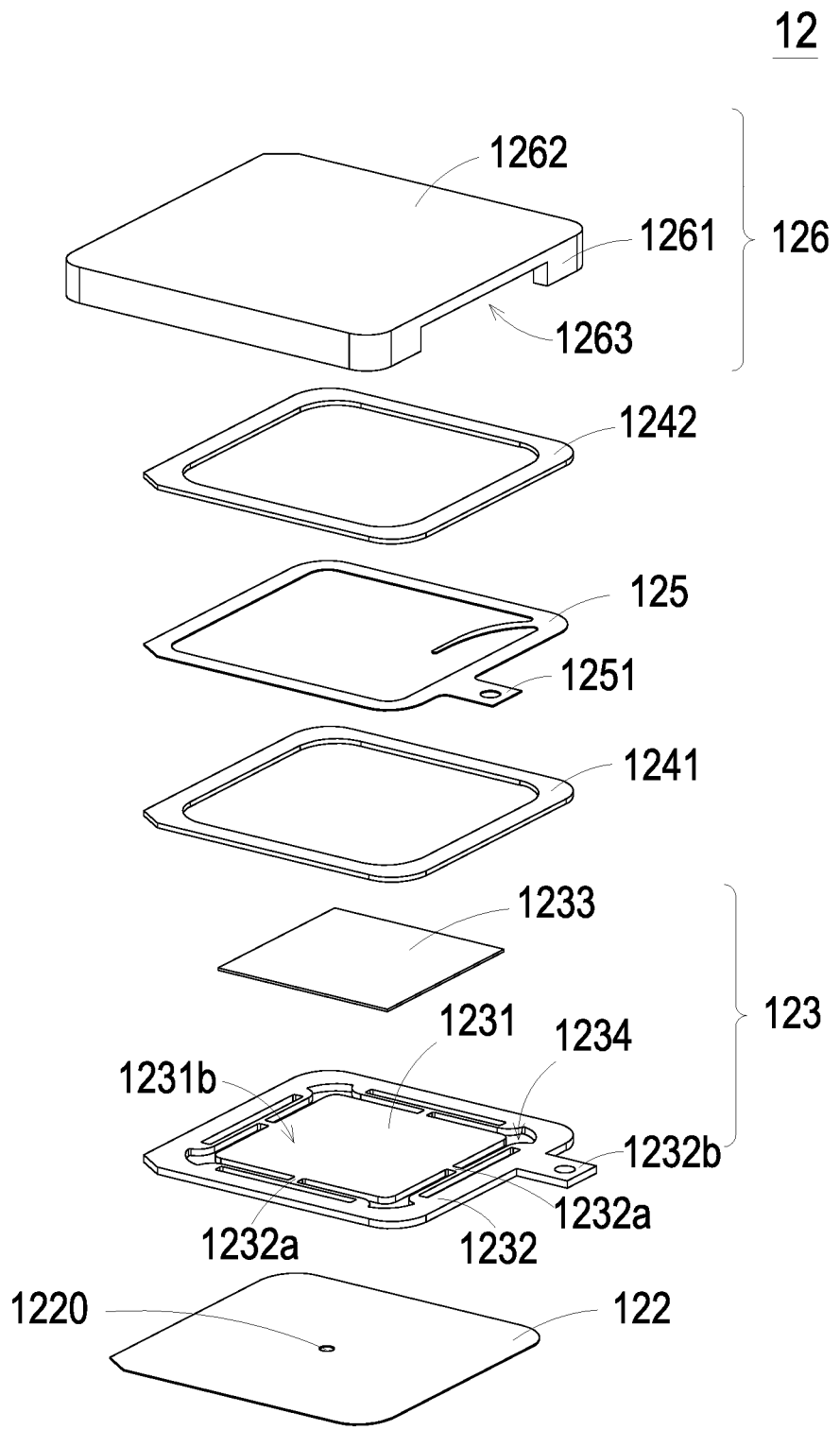
FIG. 4A is a schematic exploded view illustrating the air pump of the eyeglass buffer protection device according to an embodiment of the present invention and taken along a front side.
Figure 4B:
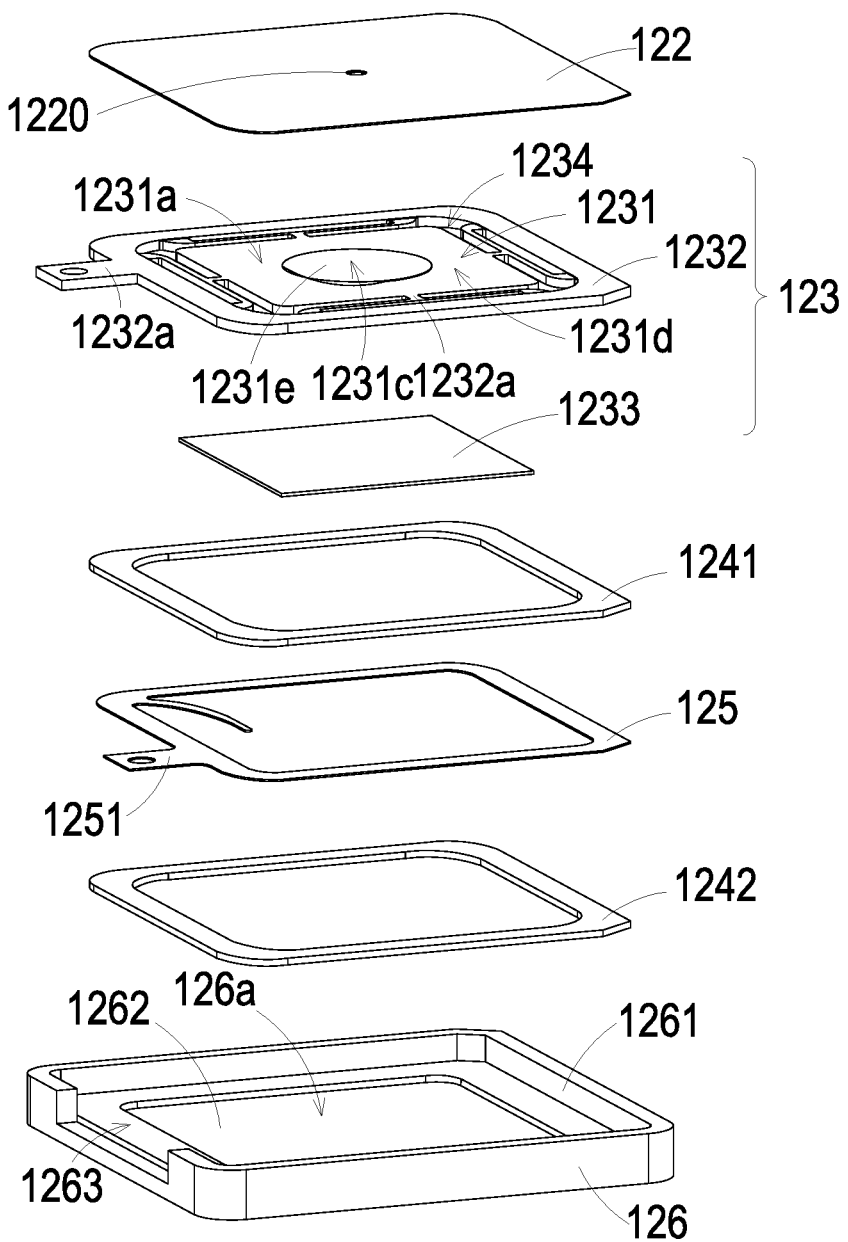
FIG. 4B is a schematic exploded view illustrating the air pump of FIG. 4A and taken along a rear side.

FIG. 4A is a schematic exploded view illustrating the air pump of the glasses according to an embodiment of the present invention and taken along a front side. FIG. 4B is a schematic exploded view illustrating the air pump of FIG. 4A and taken along a rear side.

In an embodiment, the air pump 12 is a piezoelectric air pump configured to drive the gas. In this embodiment, the air pump 12 comprises a resonance plate 122, a piezoelectric actuator 123 and a covering member 126.

The resonance plate 122 is aligned with the piezoelectric actuator 123. The resonance plate 122 comprises a central aperture 1220. The central aperture 1220 is formed in a middle portion of the resonance plate 122.

The piezoelectric actuator 123 comprises a suspension plate 1231, an outer frame 1232 and a piezoelectric element 1233. Preferably but not exclusively, the suspension plate 1231 is a square suspension plate. The suspension plate 1231 comprises a middle portion 1231c and a periphery portion 1231d. When the piezoelectric element 1233 is subjected to the curvy vibration in response to an applied voltage, the suspension plate 1231 is subjected to the curvy vibration from the middle portion 1231c to the periphery portion 1231d. The outer frame 1232 is arranged around the suspension plate 1231 and comprises at least one bracket 1232a and at least one conducting pin 1232b. Each of the at least one bracket 1232a is arranged between the suspension plate 1231 and the outer frame 1232. The two ends of the bracket 1232a are connected with the suspension plate 1231 and the outer frame 1232, respectively. Consequently, the bracket 1232a can elastically support the suspension plate 1231. The conducting pin 1232b is protruded outwardly from the outer frame 1232 so as to be electrically connected with an external power source (not shown). The piezoelectric element 1233 is attached on a second surface 1231b of the suspension plate 1231. The length of a side of the piezoelectric element 1233 is smaller than or equal to the length of a side of the suspension plate 1231, but not limited herein. When the piezoelectric element 1233 is subjected to deformation in response to an applied voltage, the suspension plate 1231 is subjected to a curvy vibration.

The covering member 126 comprises a sidewall 1261, a bottom plate 1262 and an opening 1263. The sidewall 1261 is protruded from the edges of the bottom plate 1262. Moreover, an accommodation space 126a is defined by the sidewall 1261 and the bottom plate 1262 collaboratively. The resonance plate 122 and the piezoelectric actuator 123 are accommodated within the accommodation space 126a. The opening 1263 is formed in the sidewall 1261. The conducting pin 1232b of the outer frame 1232 is protruded out of the covering member 126 through the opening 1263 so as to be electrically connected with an external circuit (not shown), but not limited herein.

The air pump 12 further comprises a first insulation plate 1241, a conducting plate 125 and a second insulation plate 1242. The first insulation plate 1241 is located over the conducting plate 125. The second insulation plate 1242 is located under the conducting plate 125. The shapes of the first insulation plate 1241 and the second insulation plate 1242 substantially match the shape of the outer frame 1232 of the piezoelectric actuator 123. The first insulation plate 1241 and the second insulation plate 1242 are made of an insulating material (e.g. a plastic material) for providing insulating efficacy. The conducting plate 125 is made of an electrically conductive material (e.g. a metallic material) for providing electrically conducting efficacy. The shape of the conducting plate 125 substantially matches the shape of the outer frame 1232 of the piezoelectric actuator 123. Moreover, the conducting plate 125 has a conducting pin 1251 so as to be electrically connected with an external circuit (not shown). Similarly, the conducting pin 1251 is protruded out of the covering member 126 through the opening 1263 so as to be electrically connected with the control unit 19.

Figure 5A:
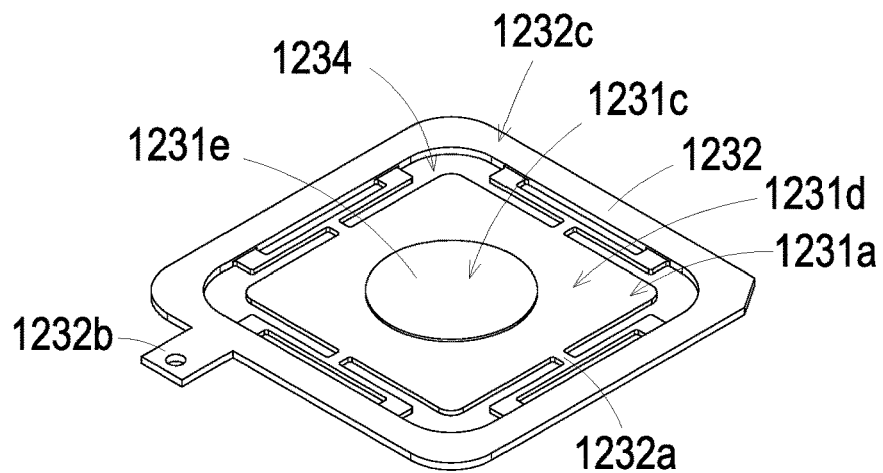
FIG. 5A is a schematic perspective view illustrating the piezoelectric actuator of the air pump according to the first embodiment of the present invention and taken along the front side.
Figure 5B:
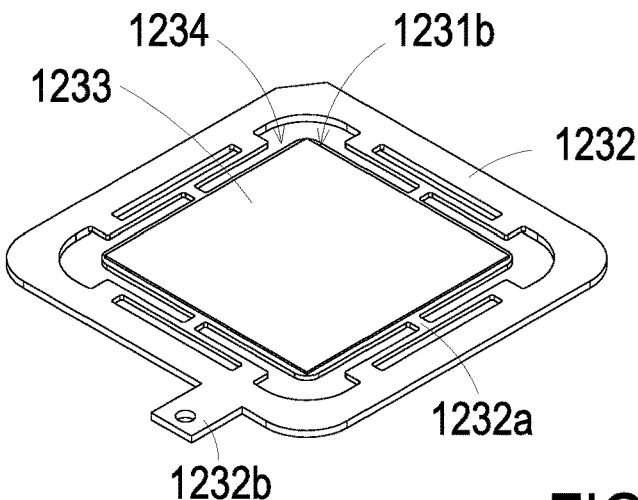
FIG. 5B is a schematic perspective view illustrating the piezoelectric actuator of the air pump according to the first embodiment of the present invention and taken along the rear side.
Figure 5C:
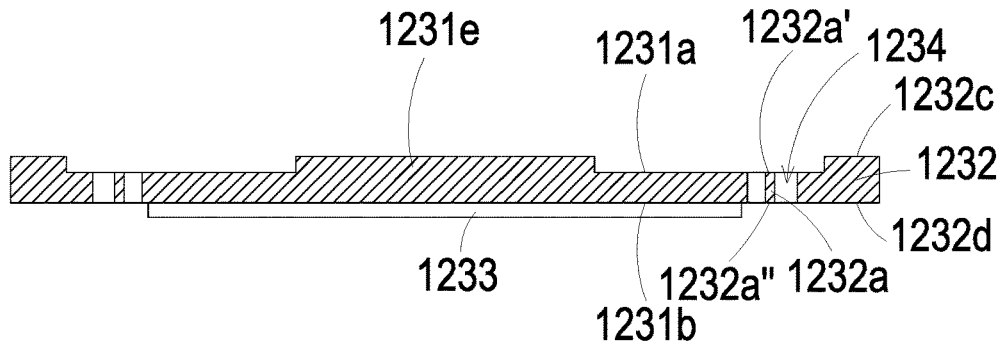
FIG. 5C is a schematic cross-sectional view illustrating the piezoelectric actuator of the air pump according to the first embodiment of the present invention.

FIG. 5A is a schematic perspective view illustrating the piezoelectric actuator of the air pump according to the first embodiment of the present invention and taken along the front side. FIG. 5B is a schematic perspective view illustrating the piezoelectric actuator of the air pump according to the first embodiment of the present invention and taken along the rear side. FIG. 5C is a schematic cross-sectional view illustrating the piezoelectric actuator of the air pump according to the first embodiment of the present invention.

In this embodiment, the suspension plate 1231 is a stepped structure. That is, the suspension plate 1231 comprises a bulge 1231e. The bulge 1231e is formed on the first surface 1231a of the suspension plate 1231 and located at the middle portion 1231c. For example, the bulge 1231e is a circular convex structure such as a cylinder. In some embodiments, the suspension plate 1231 is a square plate structure with two flat surfaces without the bulge 1231e.

Please refer to FIG. 5C again. A top surface of the bulge 1231e of the suspension plate 1231 is coplanar with a first surface 1232c of the outer frame 1232, and the first surface 1231a of the suspension plate 1231 is coplanar with a first surface 1232a' of the bracket 1232a. Moreover, the bulge 1231e of the suspension plate 1231 (or the first surface 1232c of the outer frame 1232) has a specified thickness with respect to the first surface 1231a of the suspension plate 1231 (or the first surface 1232a' of the bracket 1232a). A second surface 1231b of the suspension plate 1231, a second surface 1232d of the outer frame 1232 and a second surface 1232a" of the bracket 1232a are coplanar with each other. The piezoelectric element 1233 is attached on the second surface 1231b of the suspension plate 1231. In some other embodiments, the suspension plate 1231 is a square plate structure with two flat surfaces. That is, the structure of the suspension plate 1231 may be varied according to the practical requirements. In this embodiment, the suspension plate 1231, the outer frame 1232 and the at least bracket 1232a are integrally formed and produced by using a metal plate (e.g., a stainless steel plate). Moreover, at least one vacant space 1234 is formed between the suspension plate 1231, the outer frame 1232 and the bracket 1232a for allowing the gas to go through.

Figure 6:
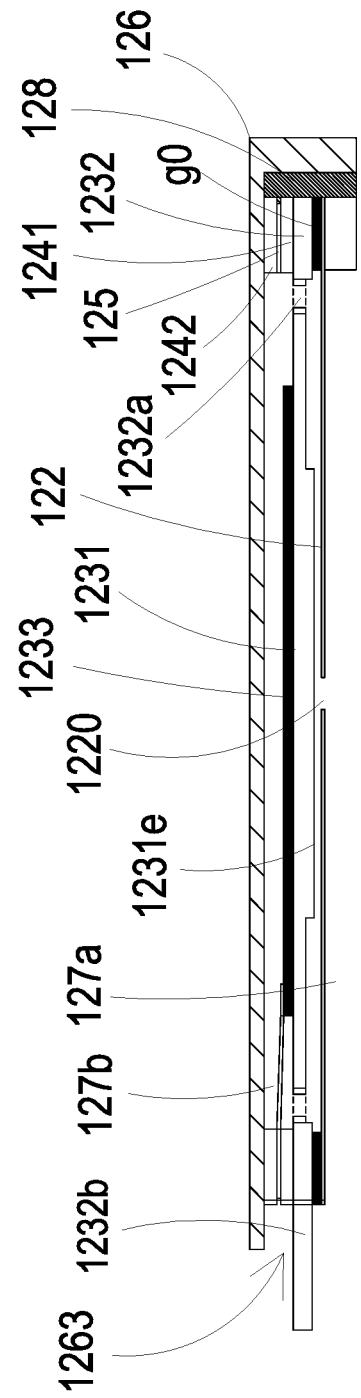
FIG. 6 is a schematic cross-sectional view illustrating the air pump of FIGS. 4A and 4B.

The inner structure and the outer structure of the air pump 12 will be described as follows. FIG. 6 is a schematic cross-sectional view illustrating the air pump of FIGS. 4A and 4B. From top to bottom, the covering member 126, the second insulation plate 1242, the conducting plate 125, the first insulation plate 1241, the piezoelectric actuator 123 and the resonance plate 122 of the air pump 12 are stacked on each other sequentially, wherein the peripheries of the piezoelectric actuator 123, the first insulation plate 1241, the conducting plate 125 and the second insulation plate 1242 are coated with glue to form a glue layer 128. The glue layer 128 is filled in the accommodation space 126a of the covering member 126 and seals the peripheries of the components. Consequently, the air pump 12 is assembled.

The air pump 12 has a square profile. It is noted that the profile of the air pump 12 may be varied according to the practical requirements. Moreover, the conducting pin 1251 (not shown) of the conducting plate 125 and the conducting pin 1232b of the piezoelectric actuator 123 are protruded out of the covering member 126 so as to be electrically connected with an external circuit. After the air pump 12 is assembled, a first chamber 127b is formed between the covering member 126 and the resonance plate 122. Moreover, a convergence chamber 127a is defined by the sidewall 1261 of the covering member 126 and the resonance plate 122 collaboratively.

In this embodiment, there is a gap g0 between the resonance plate 122 and the piezoelectric actuator 123. Moreover, a filler (e.g. a conductive adhesive) is inserted into the gap g0. Consequently, the depth of the gap g0 between the resonance plate 122 and the bulge 1231e of the suspension plate 1231 can be maintained to guide the gas to flow more quickly. Moreover, due to the proper distance between bulge 1231e of the suspension plate 1231 and the resonance plate 122, the contact interference is reduced and the generated noise is largely reduced. In some embodiments, the height of the outer frame 1232 of the piezoelectric actuator 123 is increased, so that the gap is formed between the resonance plate 122 and the piezoelectric actuator 123.

When the piezoelectric actuator 123 is actuated to perform a gas-collecting operation, the gas is introduced into the convergence chamber 127a through the opening 1263 of the covering member 126, transferred to the first chamber 127b through the central aperture 1220 of the resonance plate 122, and temporarily stored in the first chamber 127b. When the piezoelectric actuator 123 is actuated to perform a gas-releasing operation, the gas is transferred from the first chamber 127b to the convergence chamber 127a through the central aperture 1220 of the resonance plate 122 and transferred to the inflatable cushion 11 through the pressure valve structure 18.

The operations of the air pump 12 will be described as follows. FIGS. 7A to 7D schematically illustrate the actions of the air pump according to the first embodiment of the present invention.

Please refer to FIG. 7A, which shows an initial state of the air pump not in action. After the covering member 126, the second insulation plate 1242, the conducting plate 125, the first insulation plate 1241, the piezoelectric actuator 123 and the resonance plate 122 of the air pump 12 are stacked on each other sequentially, the air pump 12 is assembled. There is a gap g0 between the resonance plate 122 and the piezoelectric actuator 123. The convergence chamber 127a is defined by the sidewall 1261 of the covering member 126, the resonance plate 122 and the bottom surface 201a of the receiving part 201 collaboratively. The first chamber 127b is formed between the covering member 126 and the resonance plate 122.

Please refer to FIG. 7B. When the piezoelectric actuator 123 of the air pump 12 is actuated, the piezoelectric actuator 123 is vibrated upwardly in response to the applied voltage. Consequently, the ambient gas is introduced into the air pump 12 through the opening 1263 of the covering member 126. After the gas is converged to the convergence chamber 127a, the gas is transferred to the first chamber 127b through the central aperture 1220 of the resonance plate 122. Due to the resonance effect of the suspension plate 1231 of the piezoelectric actuator 123, the resonance plate 122 is vibrated in a reciprocating manner. That is, the resonance plate 122 is subjected to an upward deformation. Meanwhile, the position of the resonance plate 122 corresponding to the central aperture 1220 is protruded upwardly.

Please refer to FIG. 7C. The piezoelectric actuator 123 is vibrated downwardly and has returned to its original position. Meanwhile, the bulge 1231e of the suspension plate 1231 of the piezoelectric actuator 123 is close to the central aperture 1220 of the resonance plate 122. Consequently, the gas in the air pump 12 is transferred to and temporarily stored in the upper portion of the first chamber 127b.

Please refer to FIG. 7D. The piezoelectric actuator 123 is vibrated downwardly. Due to the resonance effect of the piezoelectric actuator 123, the resonance plate 122 is vibrated downwardly. Due to the downward deformation of the resonance plate 122, the volume of the first chamber 127b is shrunken. Consequently, the gas in the upper portion of the first chamber 127b is pushed toward peripheral regions of the first chamber 127b. Then, the gas is transferred downwardly through the vacant space 1234 of the piezoelectric actuator 123, and transferred through the central aperture 1220 of the resonance plate 122. From the above discussions, it can be seen that when the resonance plate 122 is vibrating along the vertical direction in the reciprocating manner, the gap g0 between the resonance plate 122 and the piezoelectric actuator 123 is helpful to increase the amplitude of vibration of the resonance plate 122. That is, the proper gap g0 between the resonance plate 122 and the piezoelectric actuator 123 allows the maximum amplitude of vibration of the resonance plate 122. Then, the resonance plate 122 is returned to the original position of FIG. 7A.

The processes of FIGS. 7A to 7D are repeatedly done. Consequently, the gas is continuously introduced into the convergence chamber 127a through the opening 1263 of the covering member 126, and transferred to the first chamber 127b. Then, the gas is transferred from the first chamber 127b to the convergence chamber 127a. Consequently, the gas can be transferred stably. When the air pump 12 is operated, the gas is sequentially transferred through the opening 1263 of the covering member 126, the convergence chamber 127a, the first chamber 127b and the convergence chamber 127a.

As mentioned above, after the air pump 12 is enabled, the gas is introduced into the inflatable cushion 11. Since the inflatable cushion 11 is inflated with the gas, the inflatable cushion 11 expands to finely fit the ear of the user. That is, the glasses 2 with the eyeglass buffer protection device 1 can be securely worn on the ears of the user and do not easily fall off, thus achieving the safe and comfortable purposes.

Figure 8A:
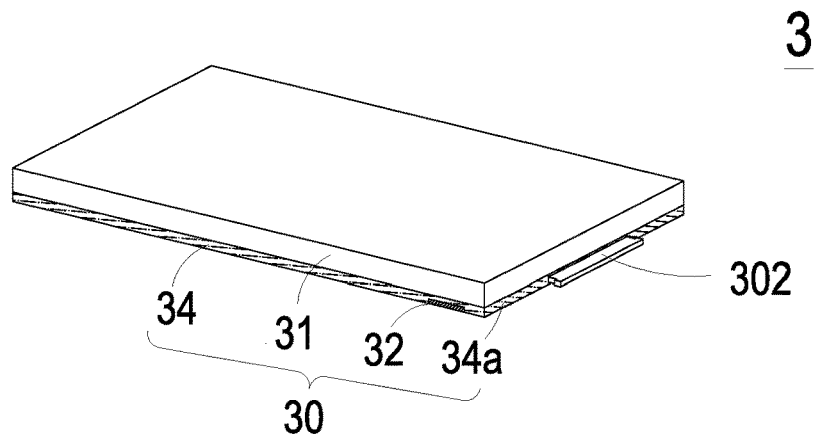
FIG. 8A is a schematic perspective view illustrating the outer appearance of an eyeglass buffer protection device according to a second embodiment of the present invention.
Figure 8B:
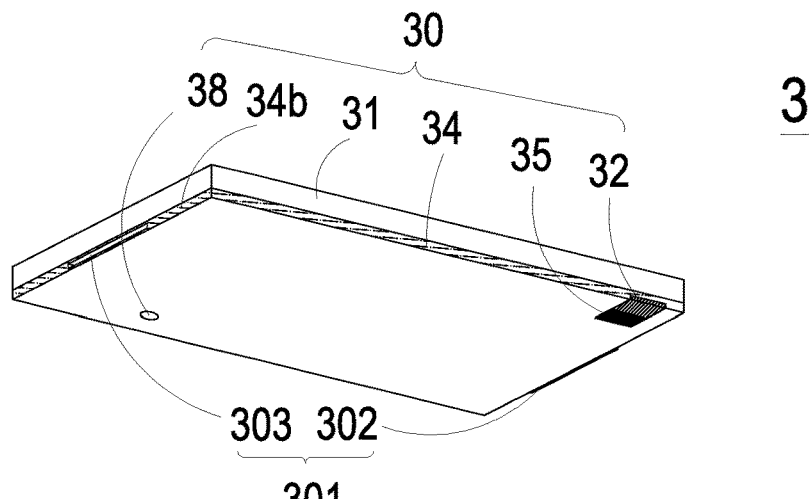
FIG. 8B is a schematic perspective view illustrating the eyeglass buffer protection device of FIG. 8A from a different angle of view.

Please refer to FIG. 8A and FIG. 8B. FIG. 8A is a schematic perspective view illustrating the outer appearance of an eyeglass buffer protection device according to a second embodiment of the present invention. FIG. 8B is a schematic perspective view illustrating the eyeglass buffer protection device of FIG. 8A from a different angle of view.

As shown in FIG. 8A and FIG. 8B, the eyeglass buffer protection device 3 of the second embodiment of the present invention comprises a main body 30 and a fixing unit 301, wherein the main body 30 further comprises an inflatable cushion 31, an air pump 32, a lining 34, a battery 35 and a pressure valve structure 38. In this embodiment, the inflatable cushion 31 is a square, slice and inflatable structure, and the fixing unit 301 is a snapping unit for coupling the two corresponding sides 34a and 34b of the main body 30. The fixing unit 301 has a buckle portion 302 and a slot portion 303, which are respectively disposed on the two corresponding sides 34a and 34b of the main body 30. After the inflatable cushion 31 is rolled up, the buckle portion 302 is fastened to the slot portion 303 so as to couple and fix the two corresponding sides 34a and 34b of the main body 30. The air pump 32 may be disposed within the lining 34 and in communication with the inflatable cushion 31 for introducing gas into the inflatable cushion 31 from the exterior of the eyeglass buffer protection device 3. The lining 34 may attach on an external surface of the inflatable cushion 31.

The battery 35 is embedded within the lining 34 and is adjacent to the air pump 32, but not limited thereto. The battery 35 is configured to provide electric power, and may be but not limited to a mercury battery.

In the second embodiment of the present invention, the pressure valve structure 38 is embedded in the external surface of the lining 34, and is in communication with the inflatable cushion 31. The pressure valve structure 38 is a switchable valve structure, which is the same as that of the previous embodiment and will not be described in details herein. In this embodiment, the eyeglass buffer protection device 3 further comprises a gas pressure sensor (not shown), a switch element (not shown) and a control unit (not shown). The gas pressure sensor, the switch element and the control unit are disposed within the lining 34, wherein the gas pressure sensor is configured to detect the inner pressure of the inflatable cushion 31 and the switch element is adapted to be turned on or turned off by the user. The control unit is electrically connected with the battery 35, the air pump 32, the gas pressure sensor, the switch element and the pressure valve structure for sending signals, receiving signals, and controlling elements to be drove or stopped.

Figure 8C:
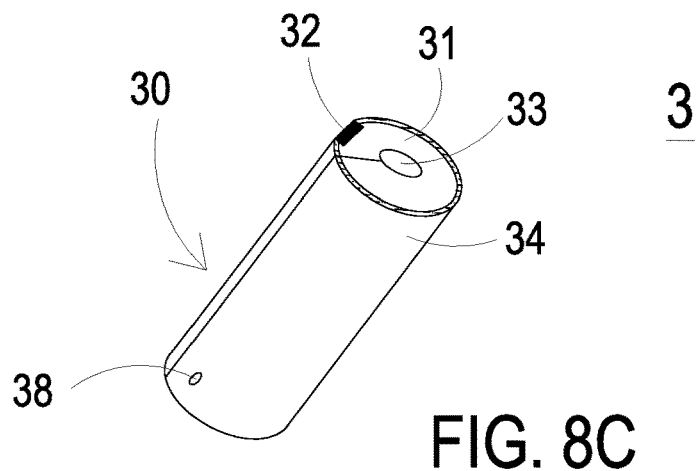
FIG. 8C is a schematic perspective view illustrating the assembled structure of the eyeglass buffer protection device according to the second embodiment of the present invention.

Please refer to FIG. 8A to FIG. 8C. FIG. 8C is a schematic perspective view illustrating the assembled structure of the eyeglass buffer protection device according to the second embodiment of the present invention. As shown in FIG. 8C, by bending the main body 30 of the eyeglass buffer protection device 3 and fastening the buckle portion 302 to the slot portion 303, the two corresponding sides 34a and 34b of the main body 30 can be coupled with each other and fixed, so that an arc column structure is formed by the main body 30 and a penetrating channel 33 is defined in the central portion of the main body 30 for penetrating one of the legs 21, 22 of the glasses 2 therethrough.

When the user turns on the switch element, the switch element issues an enabling signal to the control unit. In response to the enabling signal, the control unit enables the air pump 32 to transfer the gas into the inflatable cushion 31, so that the inflatable cushion 31 is inflated with the gas and expanded. When the gas pressure sensor detects that the pressure of the gas within the inflatable cushions 31 is higher than a threshold value, the gas pressure sensor issues a disabling signal to the control unit. In response to the disabling signal, the control unit disables the air pump 32 to prevent the inflatable cushions 31 from being damaged by excessive pressure of the gas therein, and avoids the reduction of the use life of the air pump 32 due to continuous operation.

Moreover, when the switch element is turned off, the switch element issues a pressure-relief signal to the control unit. In response to the pressure-relief signal, the control unit controls the pressure valve structure 38 to decrease the pressure in the inflatable cushion 31 by releasing the gas from the inflatable cushion 31 to the surroundings. After the inflatable cushion 31 is exhausted and restored to the deflated state, it can be easily detached and stored.

The eyeglass buffer protection device 3 of the second embodiment is applied on the glasses 2, the way of which is similar to the first embodiment and will not be described in details herein. Preferably, there are two eyeglass buffer protection devices 3 respectively disposed on each of the legs 21, 22 of the glasses 2. When the user wears the glasses 2, the user is capable of controlling the main body 30 of each of the eyeglass buffer protection devices 3 to be inflated and expanded, so that the legs 21, 22 of the glasses 2 are protected by the eyeglass buffer protection devices 3, and the expanded eyeglass buffer protection devices 3 can fit the shape of the user's face or ears to make the glasses 2 securely worn on the ears of the user and do not easily fall off, thus achieving improved safety and comfort. When the user is going to take off the glasses 2, it is also easy to control the main body 30 of each of the eyeglass buffer protection devices 3 to decrease its inner pressure and to be restored to the deflated state for being easily detached and stored. Since it is easy to attach and detach the fixing unit 30, the convenience of detachment and storage is further enhanced.

In some embodiments, the fixing unit 301 can be but not limited to be a clamping unit (not shown), the clamping unit comprises an elastic structure (not shown) and is disposed on an surface of the inflatable cushions 31 which is opposing to the surface where the lining 34 is attached on, and the main body 30 is deformable in response to the clamping force of the clamping unit. When the leg 21 or 22 of the glasses disposed within the elastic structure of the clamping unit, the eyeglass buffer protection device 3 is firmly fixed on the leg 21 or 22 by the flexibility of the clamping unit, thereby to avoid the risk of falling off, and is also conducive to detachment and storage.

In other embodiments, the fixing unit 301 can be but not limited to be a magnetic fixing unit (not shown). The magnetic fixing unit comprises at least two magnetic elements, which are disposed on the two corresponding sides 34a, 34b of the main body 30, respectively, and the magnetic elements are magnets, but not limited thereto. When the eyeglass buffer protection device 3 assembles with the glasses 2, the main body 30 is bent to from an arc column structure, and the two corresponding sides 34a, 34b of the main body 30 are coupled and fixed by the magnetically attraction of the magnetic elements, so that the eyeglass buffer protection device 3 is firmly fixed on the legs 21 or 22 of the glasses by the magnetic elements, thereby to avoid the risk of falling off, and is also conducive to detachment and storage.

In another embodiment, the fixing unit 301 could be an adhesive fixing unit (not shown), such as a Velcro (hook and loop fastener), but not limited thereto. In this embodiment, the main body 30 bent as the arc column structure is also fixed by the adherence of the adhesive fixing unit.

From the above descriptions, the present invention provides an eyeglass buffer protection device for using in a pair of glasses. The user can turn on the switch element to inflate the inflatable cushions with the gas. Consequently, the inflatable cushions are expanded until fitting closely to the ears of the user, by which the inflatable cushions are adjustable according to the shapes of the user's face or ears to be securely and comfortably fixed thereon. Since the possibility of falling down the glasses is minimized, the safety of using the glasses is increased. Moreover, the eyeglass buffer protection device has the gas pressure adjusting function, using the gas pressure sensor to detect the gas pressure within the inflatable cushions and using the control unit to control the gas pressure to be in a specified range. Since the inflatable cushions are controlled and not excessively expanded, the pressure applied to the user's ears is comfortable. In addition, the user can turn off the switch element to reduce the pressure of the inflatable cushion, or deflate the inflatable cushion when the glasses are going to be in the non-usage state. Under this circumstance, the use lives of the inflatable cushions are extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An eyeglass buffer protection device for using in a pair of glasses by detachably covering on at least one leg of the glasses, the eyeglass buffer protection device comprising:
   a main body with a penetrating channel and comprising:
      an inflatable cushion having an expandable structure;
      an air pump in communication with the inflatable cushion;
      a switch element; and
      a control unit electrically connected with the switch element and the air pump;
   wherein when the switch element is turned on, the switch element issues an enabling signal to the control unit, and the control unit enables the air pump in response to the enabling signal to make the air pump transfer an ambient gas to the inflatable cushion, so that the inflatable cushion is inflated with the gas and the main body is expanded, by penetrating the at least one leg of the glasses into the penetrating channel of the main body, the at least one leg is protected, and the main body fits closely with the ear of the user.

2. The eyeglass buffer protection device according to claim 1, wherein the main body is an arc column structure and the penetrating channel is disposed in the central portion of the main body.

3. The eyeglass buffer protection device according to claim 1, wherein the main body is a square slice structure which is bent to form an arc column structure with the penetrating channel defined therein.

4. The eyeglass buffer protection device according to claim 3, wherein the eyeglass buffer protection device further comprises a fixing unit for coupling the two corresponding sides of the main body to form the arc column structure.

5. The eyeglass buffer protection device according to claim 4, wherein the fixing unit is a snapping unit comprising a buckle portion and a slot portion.

6. The eyeglass buffer protection device according to claim 4, wherein the fixing unit is a clamping unit, a magnetic fixing unit or an adhesive fixing unit.

7. The eyeglass buffer protection device according to claim 1, wherein the eyeglass buffer protection device further comprises a lining and a soft cushion, a first surface of the lining attaches on one surface of the inflatable cushion, the soft cushion attaches on a second surface of the lining, and the air pump, the switch element and the control module are disposed within the lining.

8. The eyeglass buffer protection device according to claim 7, wherein the eyeglass buffer protection device further comprise a gas pressure sensor disposed within the lining, the gas pressure sensor is in air communication with the inflatable cushion and electrically connected with the control unit, wherein if the gas pressure sensor detects a pressure of the gas within the inflatable cushion higher than a threshold value, the gas pressure sensor issues a disabling signal to the control unit, wherein in response to the disabling signal, the control unit disables the air pump.

9. The eyeglass buffer protection device according to claim 7, wherein the glasses further comprise a pressure valve structure disposed within the lining, the pressure valve structure is in communication with the inflatable cushion and electrically connected with the control unit, the pressure valve structure is a switchable valve structure comprising a check valve and a relief valve, the check valve allows the gas to flow in one direction only to the inflatable cushion without backflow, and the relief valve is configured to adjust a pressure of the gas in the inflatable cushion.

10. The eyeglass buffer protection device according to claim 9, wherein when the switch element issues a pressure-relief signal to the control unit, the control unit controls the relief valve of the pressure valve structure to decrease the pressure of the gas in the inflatable cushion in response to the pressure-relief signal by discharging the gas from the inflatable cushion to the exterior surroundings of the eyeglass buffer protection device.

11. The eyeglass buffer protection device according to claim 1, wherein the air pump is a piezoelectric air pump.

12. The eyeglass buffer protection device according to claim 11, wherein the piezoelectric air pump comprises:
   a resonance plate having a central aperture and a movable part near the central aperture;
   a piezoelectric actuator spatially corresponding to the resonance plate; and
   a covering member comprising a sidewall, a bottom plate and an opening, wherein the sidewall is protruded from edges of the bottom plate, an accommodation space is defined by the sidewall and the bottom plate collaboratively, the resonance plate and the piezoelectric actuator are accommodated within the accommodation space, and the opening is formed in the sidewall,
   wherein a gap is formed between the resonance plate and the piezoelectric actuator to define a first chamber, wherein when the piezoelectric actuator is actuated, the gas is fed into the opening of the covering member and transferred to the first chamber through the central aperture of the resonance plate, and the gas is transferred according to a resonance effect between the piezoelectric actuator and the movable part of the resonance plate.

13. The eyeglass buffer protection device according to claim 12, wherein the piezoelectric actuator comprises:
   a suspension plate having a first surface and a second surface, wherein the suspension plate is permitted to undergo a curvy vibration;
   an outer frame arranged around the suspension plate;
   at least one bracket connected between the suspension plate and the outer frame for elastically supporting the suspension plate; and
   a piezoelectric element, wherein a length of a side of the piezoelectric element is smaller than or equal to a length of a side of the suspension plate, and the piezoelectric element is attached on the second surface of the suspension plate, wherein when a voltage is applied to the piezoelectric element, the suspension plate is driven to undergo the curvy vibration.

14. The eyeglass buffer protection device according to claim 13, wherein the suspension plate is a square suspension plate with a bulge.

15. The eyeglass buffer protection device according to claim 13, wherein the piezoelectric air pump further comprises a conducting plate, a first insulation plate and a second insulation plate, wherein the resonance plate, the piezoelectric actuator, the first insulation plate, the conducting plate, the second insulation plate and the covering member are stacked on each other sequentially.

* * * * *